US010288737B2

(12) United States Patent
Mooney et al.

(10) Patent No.: US 10,288,737 B2
(45) Date of Patent: May 14, 2019

(54) LIDAR SENSING SYSTEM

(71) Applicant: WIRELESSWERX INTERNATIONAL, INC., Urbanizacion Marbella (PA)

(72) Inventors: Patrick Mooney, Brea, CA (US); Raymond V. Gibson, Fullerton, CA (US)

(73) Assignee: Wirelesswerx International, Inc., Ubanizacion Marbella (PA)

( * ) Notice: Subject to any disclaimer, the term of this patent is extended or adjusted under 35 U.S.C. 154(b) by 0 days.

(21) Appl. No.: 15/708,219

(22) Filed: Sep. 19, 2017

(65) Prior Publication Data

US 2019/0086545 A1 Mar. 21, 2019

(51) Int. Cl.
*G01C 3/08* (2006.01)
*G01S 17/89* (2006.01)
*G01S 17/06* (2006.01)
*G01S 17/02* (2006.01)
(Continued)

(52) U.S. Cl.
CPC .............. *G01S 17/89* (2013.01); *G01S 7/484* (2013.01); *G01S 7/486* (2013.01); *G01S 17/023* (2013.01); *G01S 17/06* (2013.01)

(58) Field of Classification Search
CPC combination set(s) only.
See application file for complete search history.

(56) References Cited

U.S. PATENT DOCUMENTS

| 5,557,513 A | 9/1996 | Frey et al. |
| 8,209,219 B2 | 6/2012 | Fitzpatrick et al. |
| 9,036,028 B2 | 5/2015 | Buehler |

(Continued)

FOREIGN PATENT DOCUMENTS

| CN | 105893962 A | 8/2016 | |
| FR | 3030056 A1 * | 6/2016 | ............. G01S 17/42 |

(Continued)

OTHER PUBLICATIONS

Shackleton et al., "Tracking People with a 360-Degree Lidar," Proceeding AVSS '10 Proceedings of the 2010 7th IEEE International Conference on Advanced Video and Signal Based Surveillance pp. 420-426 (2010).

(Continued)

*Primary Examiner* — Samantha K Abraham
(74) *Attorney, Agent, or Firm* — Greenberg Traurig, LLP

(57) ABSTRACT

LiDAR ranging devices include an optical transmitter, and an optical receiver assembly. There is one LiDAR, and there can be more LiDARs each covering a field of sensing. The LiDAR devices are mounted within a building on a support structure in spaced relationship from each other. The fields of sensing from each LiDAR collectively provide an enhanced field of sensing of an area in the building. Each LiDAR and its base are tuned to sense human traffic. A base collects sensed data from each LiDAR such that tracking information and movement of human traffic over the enhanced area is received by the base. The fields of sensing of each LiDAR can overlap, and an analytic program stitches the sensed data from each LiDAR to obtain a stitched map of sensed data over the enhanced area. Barriers to line of site between humans to be sensed and LiDAR devices are minimized by the LiDARs.

21 Claims, 12 Drawing Sheets

(51) Int. Cl.
*G01S 7/486* (2006.01)
*G01S 7/484* (2006.01)

(56) References Cited

U.S. PATENT DOCUMENTS

| | | |
|---|---|---|
| 2005/0065834 A1 | 3/2005 | Hale et al. |
| 2006/0279422 A1 | 12/2006 | Sweatte |
| 2007/0239569 A1 | 10/2007 | Lucas et al. |
| 2007/0282665 A1 | 12/2007 | Buehler et al. |
| 2008/0189170 A1 | 8/2008 | Ramachandra |
| 2008/0290182 A1 | 11/2008 | Bell et al. |
| 2008/0294487 A1 | 11/2008 | Nasser |
| 2009/0259549 A1 | 10/2009 | Winand et al. |
| 2009/0326807 A1 | 12/2009 | Ramaswamy et al. |
| 2010/0161490 A1 | 6/2010 | Alrabady et al. |
| 2011/0001827 A1 | 1/2011 | Ortiz et al. |
| 2011/0041088 A1 | 2/2011 | Mason et al. |
| 2011/0176000 A1 | 7/2011 | Budge et al. |
| 2011/0231419 A1 | 9/2011 | Papke et al. |
| 2012/0316953 A1 | 12/2012 | Ramchandani et al. |
| 2016/0161600 A1 | 6/2016 | Eldada et al. |
| 2017/0006432 A1 | 1/2017 | O'Sullivan et al. |
| 2017/0156124 A1 | 6/2017 | Ashley, Jr. et al. |
| 2017/0261595 A1* | 9/2017 | Wu .................... G01S 17/89 |
| 2018/0088216 A1* | 3/2018 | Gill .................... G01S 7/4861 |

FOREIGN PATENT DOCUMENTS

| | | |
|---|---|---|
| FR | 3030056 A1 | 6/2016 |
| GB | 2383214 A | 6/2003 |

OTHER PUBLICATIONS

Adiaviakoye Ladji et al., "Tracking of multiple people in crowds using laser range scanners," 2014 IEEE Ninth International Conference on Intelligent Sensors, Sensor Networks and Information Processing (ISSNIP), IEEE, Apr. 21, 2014, pp. 1-6.

Akamatsu Shun-ichi et al., "Development of a person counting system using a 3D laser scanner," 2014 IEEE International Conference on Robotics and Biomimetics (ROBIO 2014), IEEE, Dec. 5, 2014, pp. 1983-1988.

Lee Jae Hoon et al., "Security Door System Using Human Tracking Method with Laser Range Finders," Mechatronics and Automation, 2007. ICMA 2007. International Conference ON, IEEE, PI, Aug. 1, 2007, pp. 2060-2065.

Partial European Search Report to corresponding EP Application No. 17192976 completed Feb. 27, 2019 (15 pages).

Search Report and Written Opinion to corresponding EP Application No. 14157757.7 dated Feb. 9, 2018 (13 pages).

Supplemental European Search Report to corresponding EP Application No. 17 19 2976 completed May 3, 2018 (6 pages).

\* cited by examiner

LIDAR SENSING SYSTEM

BACKGROUND

The present disclosure relates generally to the field of environment sensing, and more particularly to the use of Time of Flight (ToF) LiDAR (Light Detection and Ranging) sensors for real-time three-dimensional mapping and object detection, tracking, identification and/or classification.

A LiDAR sensor is a light detection and ranging sensor. It is an optical remote sensing module that can measure the distance to a target or objects in a scene, by irradiating the target or scene with light, using pulses (or alternatively a modulated signal) from a laser, and measuring the time it takes photons to travel to said target or landscape and return after reflection to a receiver in the LiDAR module. The reflected pulses (or modulated signals) are detected, with the time of flight and the intensity of the pulses (or modulated signals) being measures of the distance and the reflectivity of the sensed object, respectively.

SUMMARY OF THE DISCLOSURE

A LiDAR-based system and method are used for beamforming and steering of laser beams and the detection of laser beams. Transmitter and receiver electronics, power management electronics, control electronics, data conversion electronics and processing electronics are also included in the system and used in the method.

Laser pulses beam formed reflect from objects in the field of view (FOV) of said OPA, and are detected by a detector or a set of detectors.

A LiDAR system includes at least one LiDAR, and any subset and any number of complementary sensors, data processing/communication/storage modules, and a balance of system for supplying power, protecting, connecting, and mounting the components of said system.

A LiDAR system may contain a plurality of LiDAR sensors, and a LiDAR sensor may contain a plurality of optical transmitters.

This application relates generally to tracking the movement of humans in a building.

In particular, the disclosure relates to a LiDAR apparatus, LiDAR system and LiDAR method for improving tracking and queuing in the sense that human entities in the location in the building are better served by permitting for shorter queuing and times in the queue. Further the disclosure concerns a LiDAR apparatus, LiDAR system and LiDAR method for tracking the flow of humans in a concourse, including, for instance measuring dwell times in front of advertisement and the monitoring of stores visited and for how long.

SUMMARY OF THE DISCLOSURE

The present disclosure relates to an apparatus, system, and method for a facility with one or mode LiDAR devices deployed in a geographical zone defined by an enclosed building structure and having a predetermined shape, namely an area.

With the LiDAR device location data of moving humans is attained and processed, and the apparatus system and method attains this also when the human is hidden for different times, which attainment is achieved by one or more algorithms premised on anticipated movement of a human. Stitching of Fi-Fo location data and the planning of an area where human movement may intentionally, by virtue of the area design and usage be slowed, speeded up, stopped is factored into attainment and analysis of location data from the one or more LiDAR devices disposed in the monitoring zone or area.

The area can also include a location node having a transceiver of wireless signals. The node communicates with a central hub and mobile devices in the facility. The nodes are located in a specific location in the facility, and provide data about the movement of the entities in the facility relative to the location. Includes at least one of entry into the location, departure from the location, amount of time spent in the vicinity of the location; and the data being transmitted to the operator in at least one of real time or being for storage and analysis at a later time for use by the operator. There can be a series of location nodes in the facility. The nodes provide data about the movement of the entities in the facility, such data including the travel path of the entities in the facility. In one form the facility is a physically defined structure formed by physical walls.

In one or more embodiments, the system includes transmitting location data selectively through Bluetooth™ equipped mobile personal devices and selected nodes the user's location data. The selected nodes transmit the data to a control center via other nodes within selectively at least one of a mesh network, relay stations, or intermediate supplementary stations. The user's location data is processed and analyzed at selectively at least one of a control center or an intermediate supplementary station.

In one or more embodiments, the system includes using a geographical area, where the area is multi-dimensional, and messaging a movable entity that has a transponder or subscriber device. The device being selectively a cell phone, personal digital assistant (PDA), pager, computer, or device which is configured to be in wireless communication with other devices through a suitable network. In addition, the system includes loading from a computing device to a memory in a transponder or subscriber device a plurality of coordinates; mapping the coordinates on a pixilated image wherein the assigned pixilated image is configurable; and forming a contiguous array of pixels that enclose a shape in the pixilated image to form the geographic space.

DRAWINGS

The foregoing aspects and advantages of the present disclosure will become more readily apparent and understood with reference to the following detailed description, when taken in conjunction with the accompanying drawings, wherein:

FIG. 1 is a representation of a 3 dimensional sensing LiDAR device.

FIG. 2A is a representation of the mounting of LiDAR devices along a path where human movement is to be tracked. The LiDAR devices are mounted for instance on ceilings, walls, pillars and poles and have overlapping scan areas. The height could be at 7 feet above a floor or in other cases 9 feet or more, depending on the facility where there is tracking Barriers to line of sight between a human and one or more the devices are shown. Also shown are the Fi and Fo (first in and first out) features which are applicable to human tracking.

FIG. 2B is a representation of the mounting of LiDAR devices along a path where human movement is to be tracked, over at least two different levels, for instance an upper level departure area of an airport building and a lower level area arrival area. These areas and each part of the area of the upper and/or lower levels and both levels in total are effectively stitched into an enhanced area through electronics, software and analytical systems. LiDAR device search areas are located on different floors of a building, and wherein the analytic process effects stitching of data from different floors, thereby to track humans moving between different floors.

FIG. 3 is a representation of the stitching together of the scanned sensing data from different LiDAR devices and their communication with a base station for analysis. Different bases stations are in turn connected with a central base station. The base stations and the central base station affects analysis of stitched data from different LiDAR devices. In some other cases the analysis, in part or whole is on a server and/or on a cloud.

Figure 6:
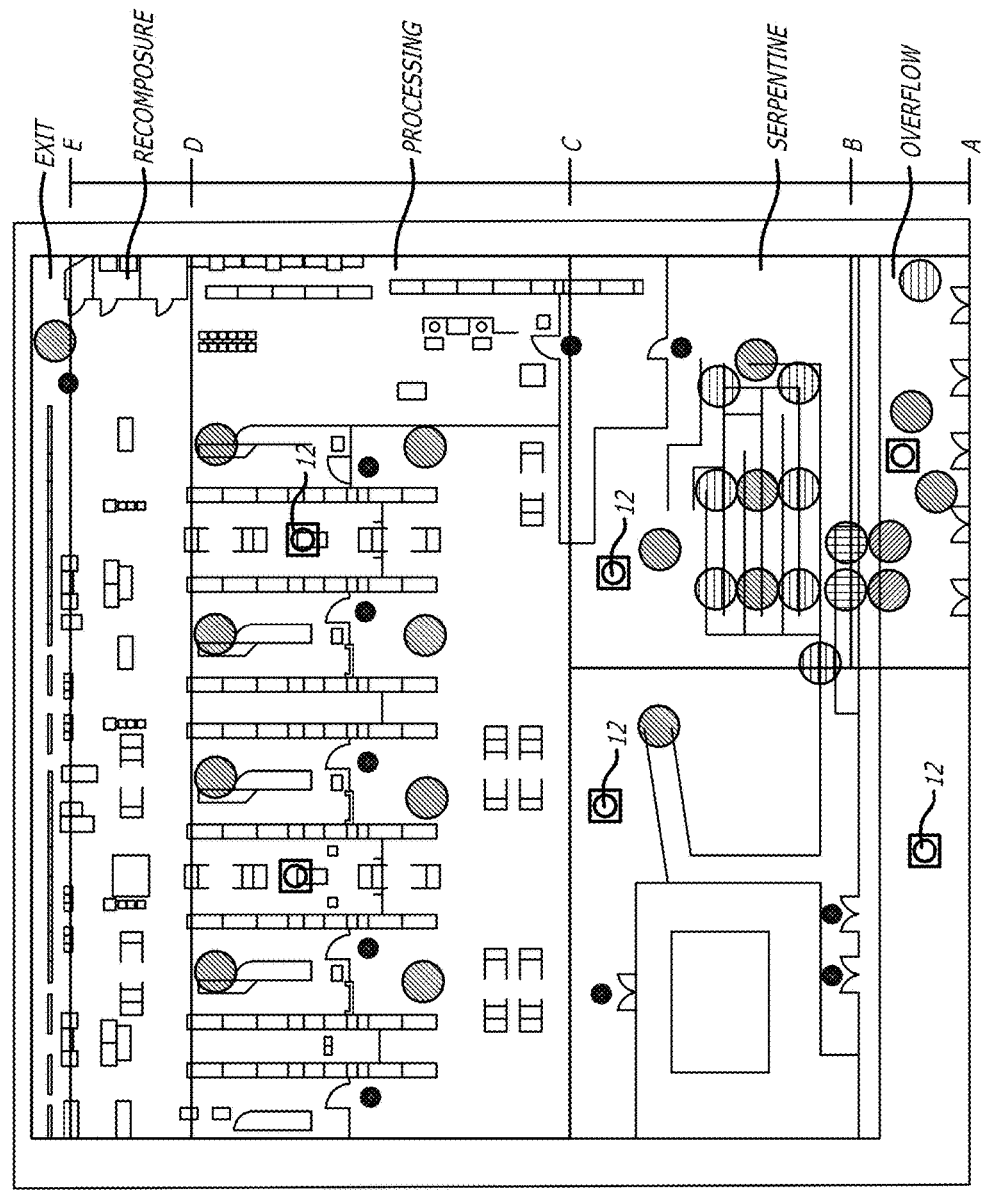

FIG. 6 is an airport plan with doors for entry and exit from the building terminal. Within the terminal, there is an internal plan of an airport facility showing queue metrics, being an overflow area which is also the entry to the monitored area, the serpentine where a queue develops to approach a TSA checking area, an area where processing is done and then the re-composure area after the TSA processing, the exit from the TSA, and the terminal areas beyond the TSA checking stations, including stores, eating areas and the departure gates. There are different LiDAR devices, nodes, a base station, cameras and sensors. Tracking of humans, queue measurements, queue paths, hardware placement details, and queue metric details are disclosed and shown. The layout is shown with LiDAR devices and nodes and other sensing and monitoring devices in location.

Figure 3:
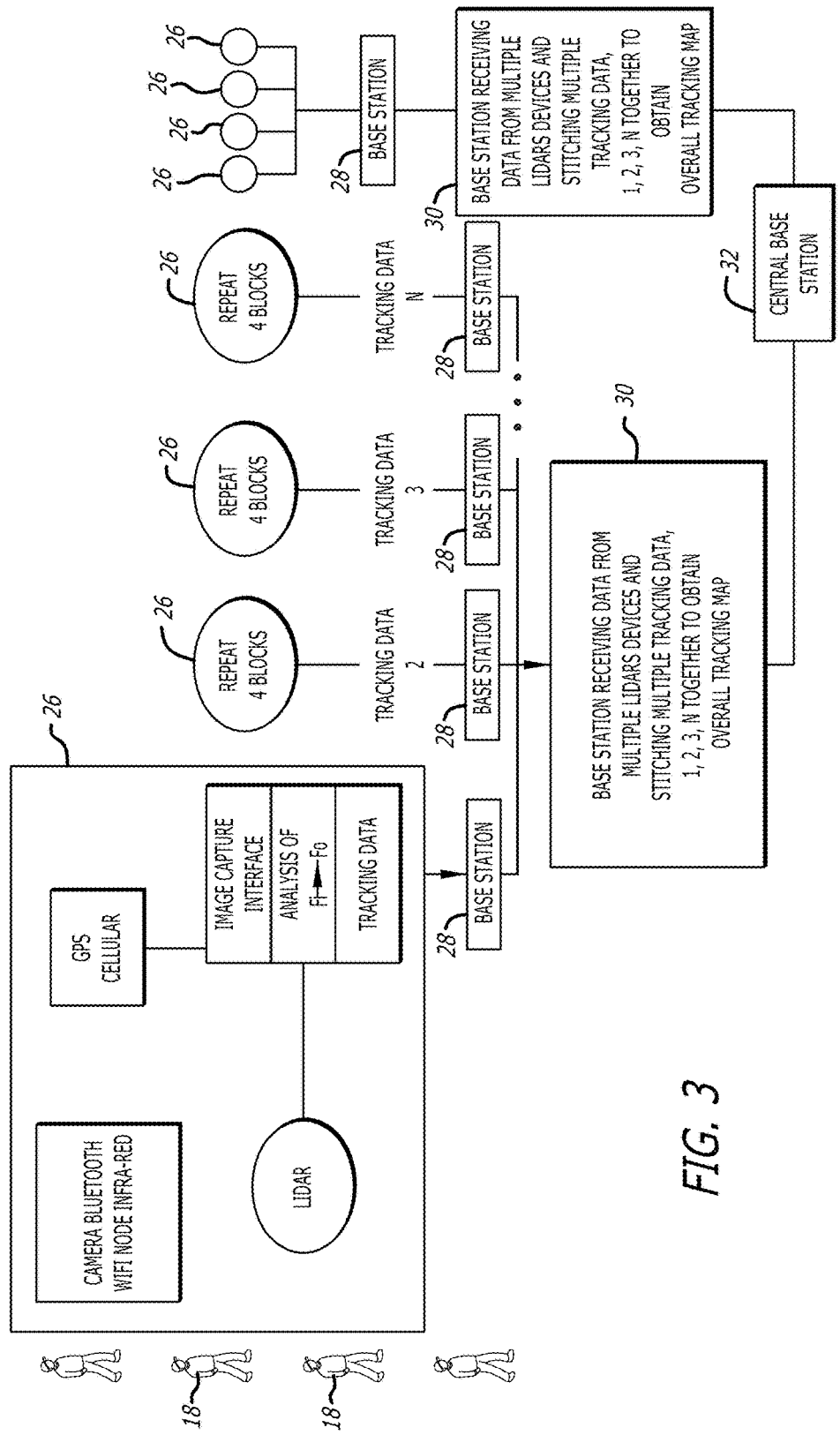
Figure 4:
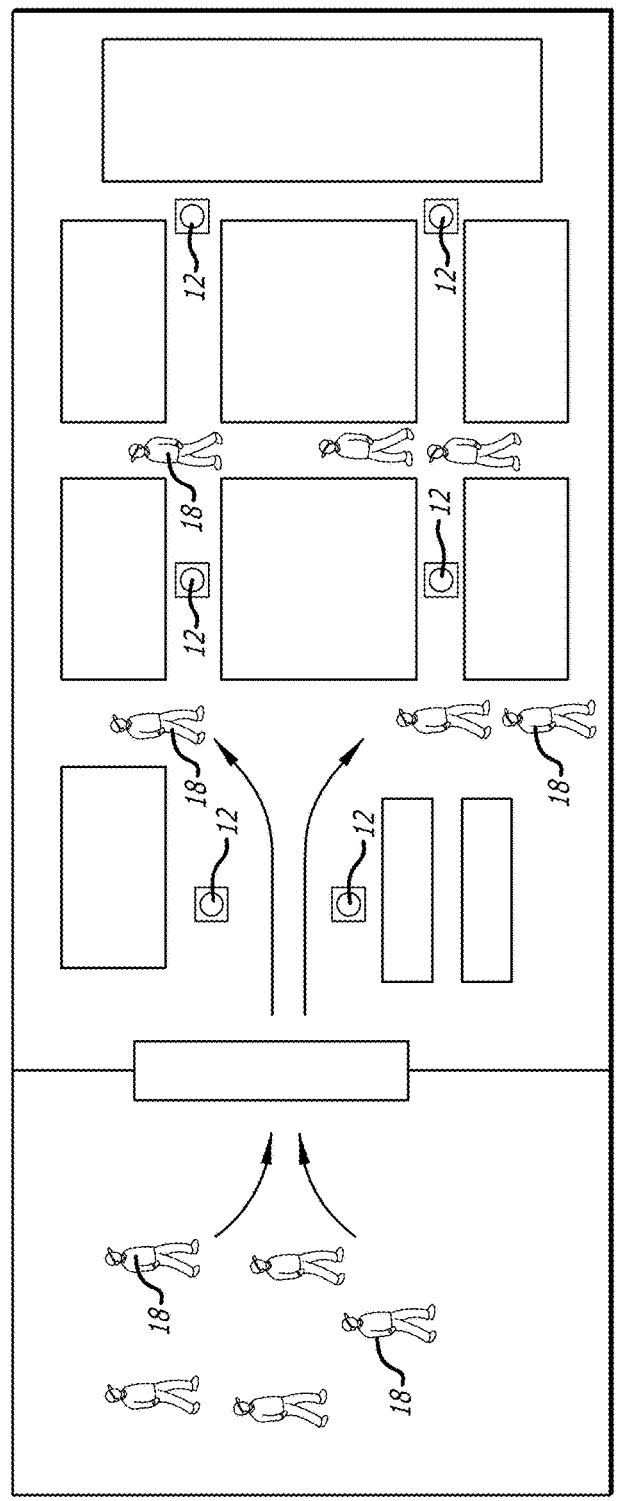
FIG. 4 is a representation of interior traffic in a location, which is setup with three-dimensional sensing LiDAR device.
Figure 5:
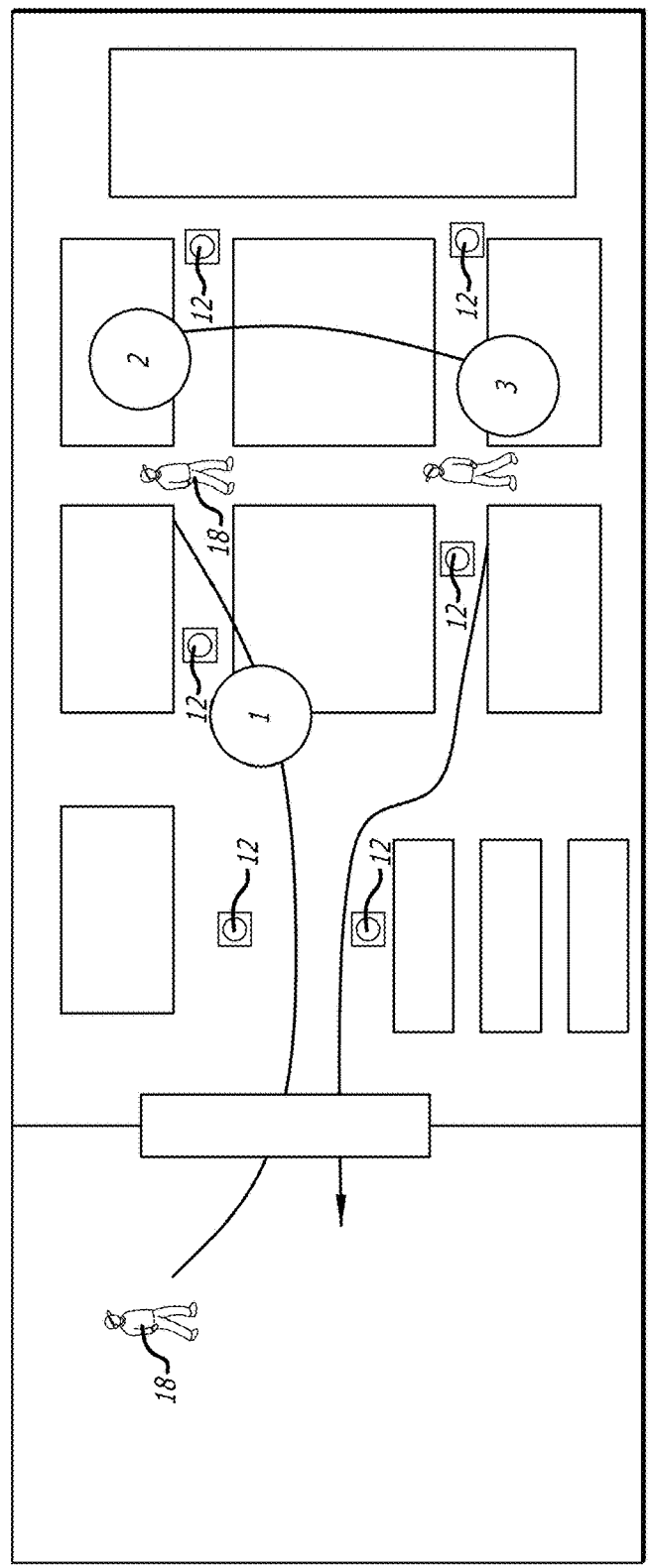
FIG. 5 is a representation of interior room or space fitted with LiDAR devices showing traffic in the room or space location.
Figure 7:
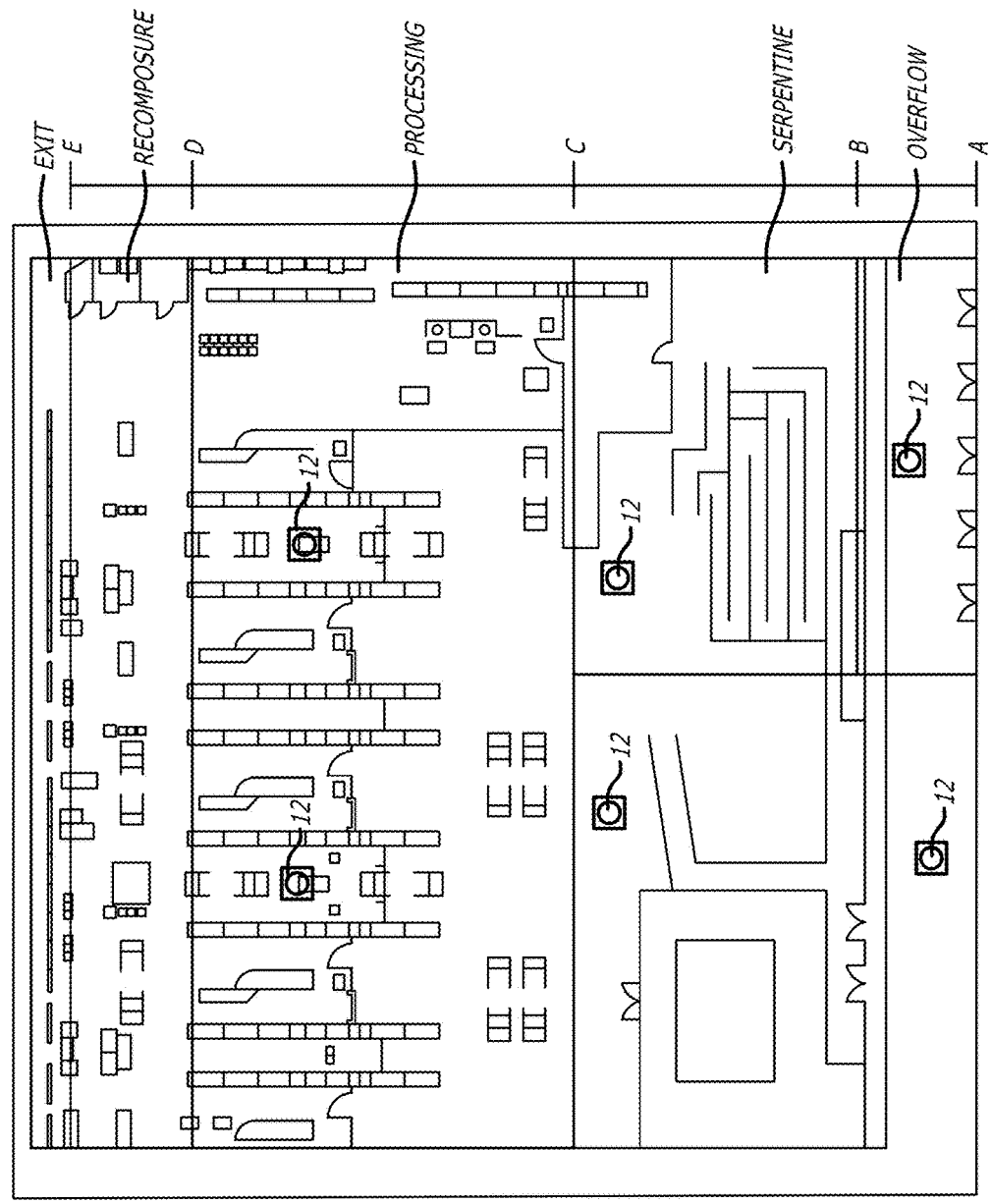

FIG. 7 is a similar layout to FIG. 6 shown with only LiDAR devices in location which would operate with one or more base stations, as shown for instance in FIG. 3.

Figure 8:
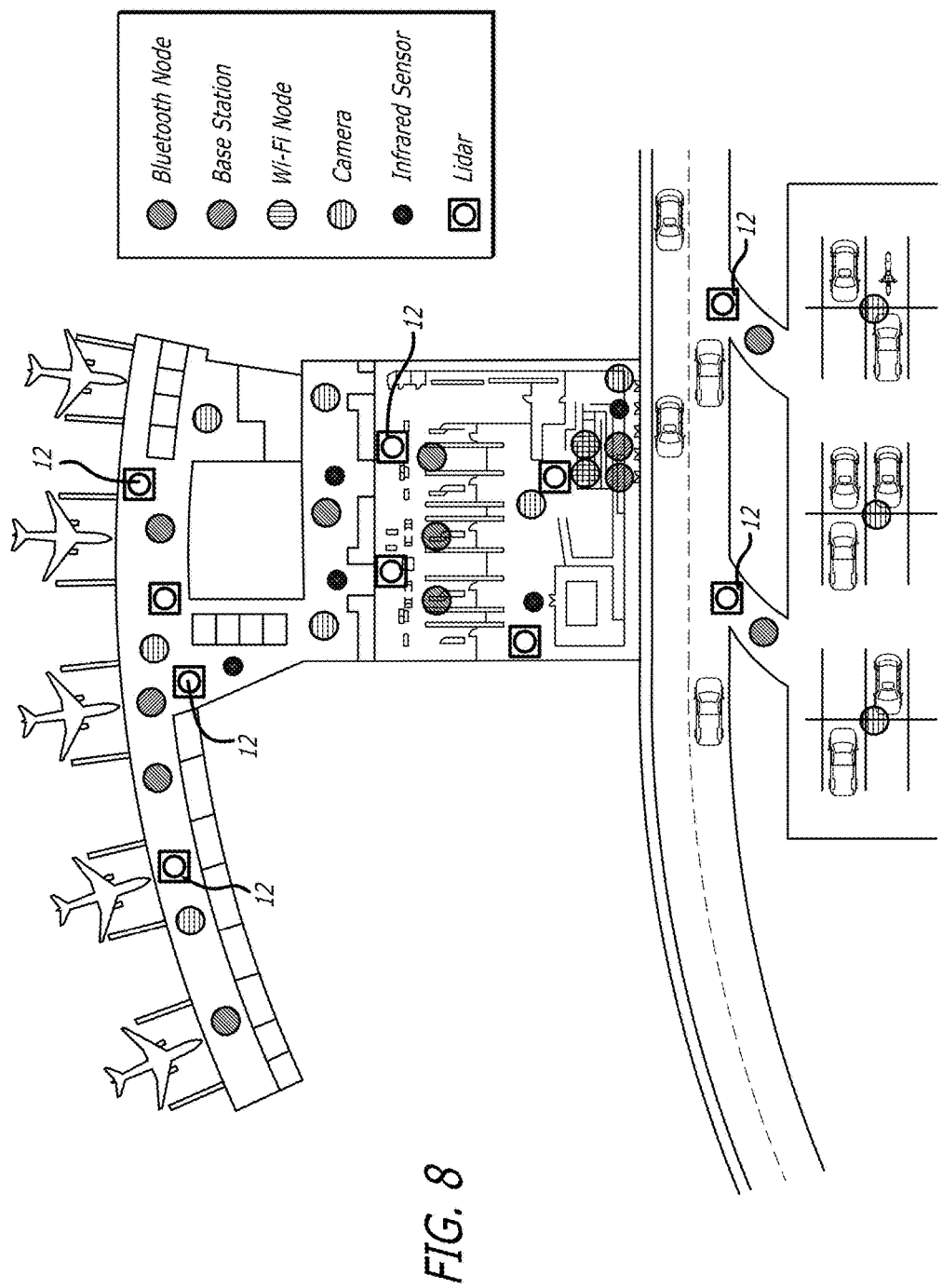

In FIG. 8 is the approach and departure areas relative to the terminal is shown with automobiles and the parking structure associated with terminals and different LiDAR devices, nodes, a base station, cameras and sensors.

Figure 9:
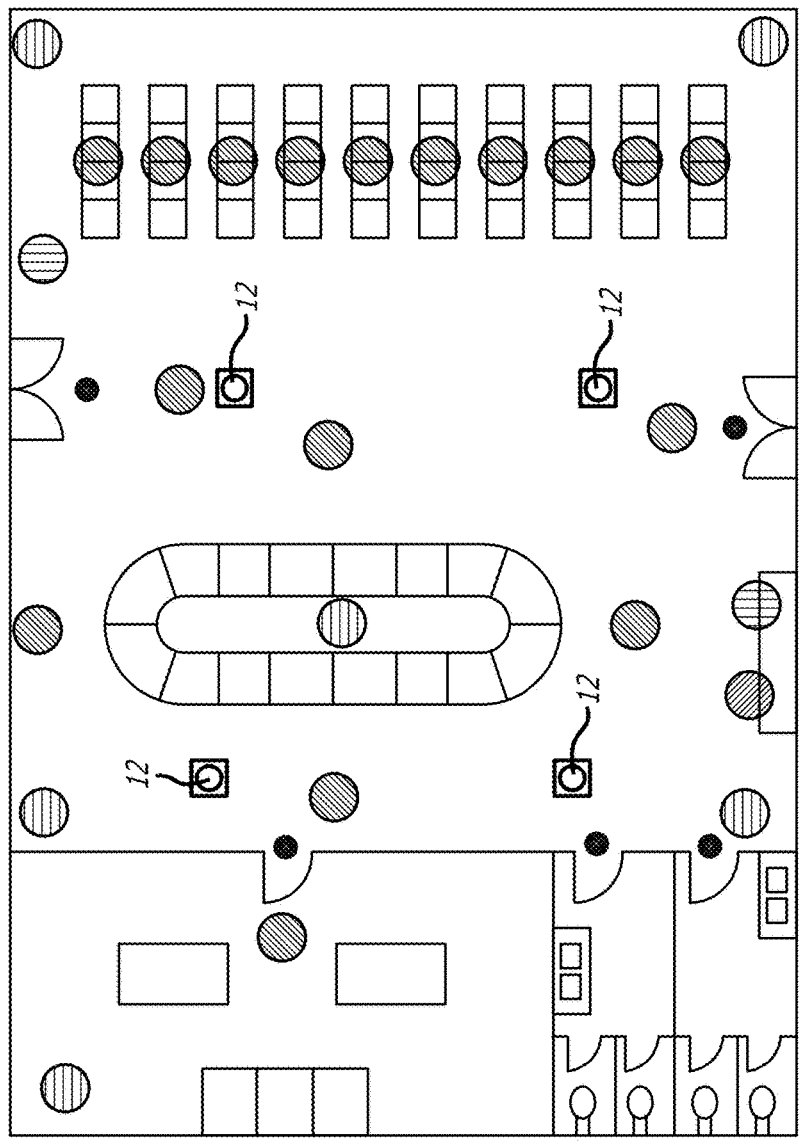

FIG. 9 is an airport plan with doors for entry and exit from a building terminal. Within the terminal, there is an internal plan of an airport facility showing a baggage claim area with a baggage carousel, seating, restroom area and different LiDAR devices, nodes, a base station, cameras and sensors.

Figure 10:
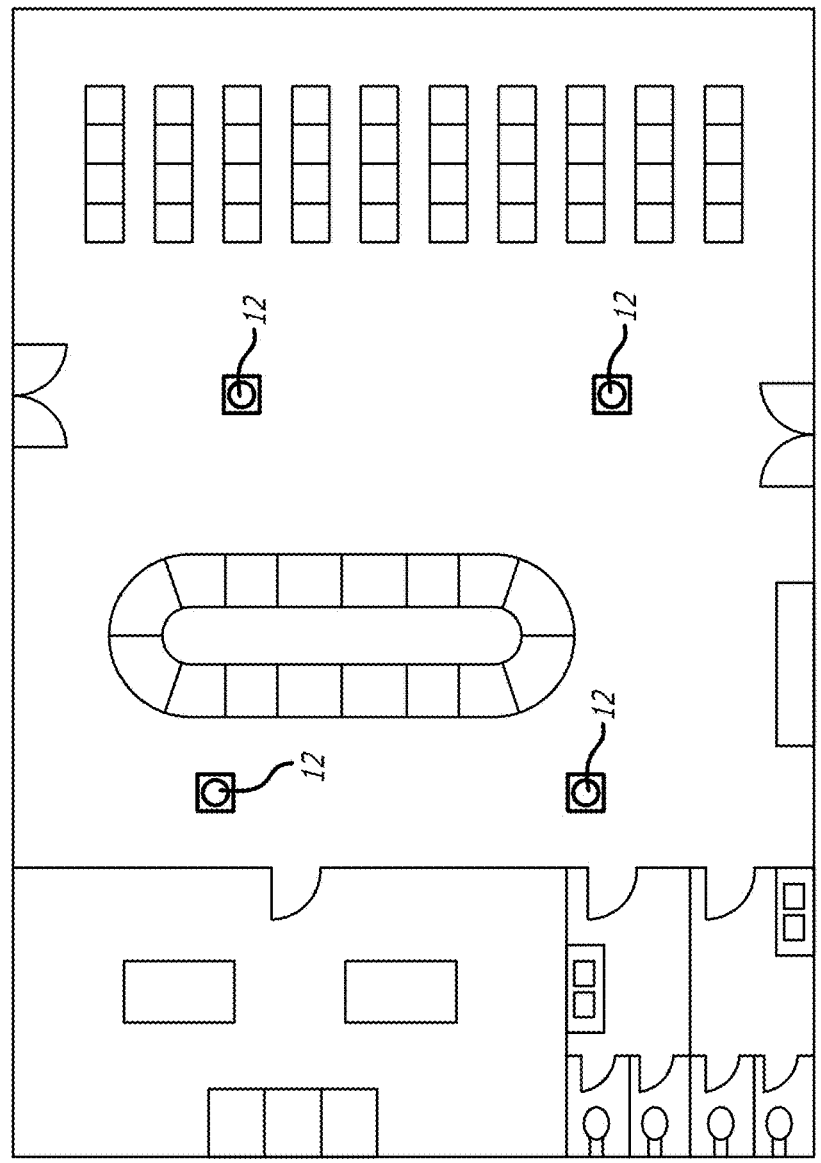

FIG. 10 is an airport plan with doors for entry and exit from a building terminal. Within the terminal, there is an internal plan of an airport facility showing a baggage claim area with a baggage carousel, seating, restroom area and different LiDAR devices, which would operate with one or more base stations.

Figure 11:
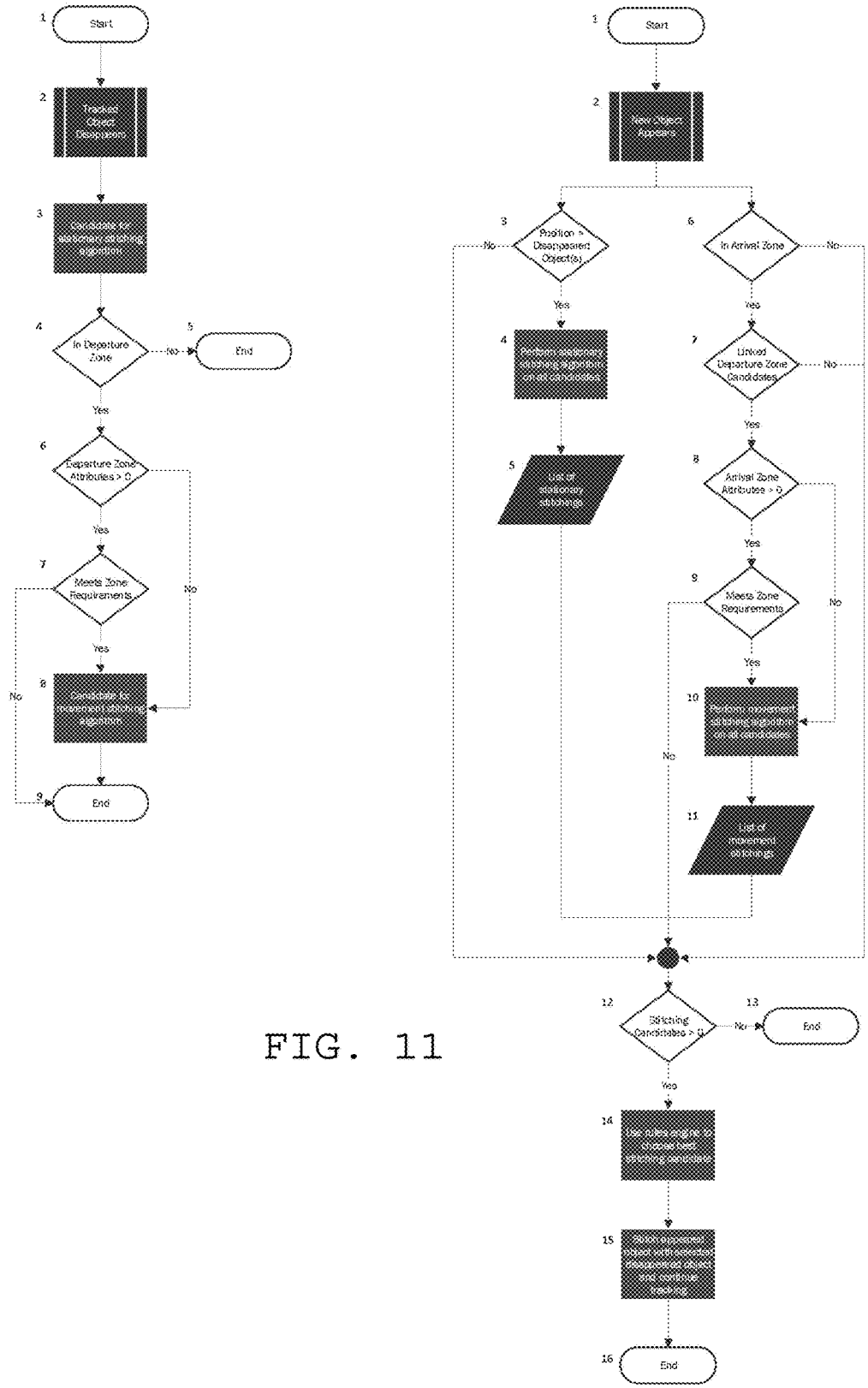

FIG. 11 is a flow diagram illustrating a stitching protocol.

DESCRIPTION

The disclosure concerns an apparatus, system and method. The disclosure comprises at least one LiDAR device 12 wherein data of different human movement as sensed by the device is stitched together to provide a movement map of the humans. "Stitching" means taking a first sensed location and/or and travel pattern of a human and combining that with a second sensed location and/or and travel pattern of the human to obtain a combined sensed location and/or and travel pattern of the human.

The human movement to be stitched is where the movement of the human is unpredictable, or is forced to be irregular by the environment, area or zone in which the LiDAR is located and being used for sensing. By the term "unpredictable" is meant to cover events which are not a normal pattern or sequence or an expected pattern or sequence. Namely the normal regular expected velocity of persons being tracked, is in fact irregular. This could be because the speed of movement changes from a regular unpredictable pace or an anticipated pace. For example, a single LiDAR sensor could detect the entrance and exit of a body scanner, for instance, in an airport building but not see inside the body scanner. Here the human would enter the scanner at certain velocity, and likely a decelerating velocity. Then when the human is in the scanner, sensing would suddenly stop for some predetermined time. Then when the human leaves the scanner the sensing, there will be an acceleration of sensing, and the trajectory can possibly change. In this instance, for example, a single LiDAR senses zone is focused in and around a body scanner could be geared to affect the stitching. Stitching can be applied to cars on highways, in parking garages and throughout a city (example: a car enters and exits a tunnel). Stitching can be applied to first responders in a building (example: two firemen are traversing a building and one is not stitched because he stopped/collapsed). Stitching can possibly predict that two objects are going to collide and warn one or both of the potential danger. In other applications of stitching, there are events of non-movement: For instance, a tracked moving entity becomes stationary for an abnormally long period of time, or period of time beyond the normal scanning time of a LiDAR device, such that this non-movement results in a simple LiDAR system losing that person as background. When that entity returns to movement, that entity would not be identified with any linkage to that first detection, but the stitched LiDAR system of the disclosure picks up any return of movement of that same entity in a manner that a simple LiDAR could not do. In another instance, in a defined geographical area being scanned by one or more stitched LiDAR devices, for instance, an airport with multiple terminals, a moving entity such as a person can be detected entering a train, bus or other form of transport or vehicle in one area of the airport and then alighting from that train, bus or other form of transport or vehicle at another part of the airport.

There can further be at least two time-of-flight LiDAR ranging devices 12, each LiDAR device includes an optical transmitter, an optical receiver assembly, power regulation electronics, control electronics, data conversion electronics, and processing electronics; and each LiDAR covering a field of sensing.

The single one, two or more devices are mounted within a building on a support structure, for instance, a wall 24 or on or near ceiling 20 in spaced relationship from each other. The fields of sensing from each LiDAR are defined by the lines 14 and 16 respectively. They can be at least adjacent the other whereby collectively an enhanced field of sensing of an area in the building is achieved. Each LiDAR with its base 28 is tuned to sense human traffic.

A base collects sensed data from each LiDAR such that tracking information and movement of human 18 traffic over the enhanced area is received by the base.

The fields of sensing of each LiDAR which has stitched together the different movement profiles, movement and happenings can in turn overlap each other, and an analytic program overlays the sensed data from each LiDAR to obtain an overlaid or contiguous map of sensed data over the enhanced area.

The LiDAR is dependent on line of sight. The disclosed method provides the following, particularly in relation to an airport terminal:

Apparatus, system and method for stitching together the path of an object being tracked with LiDAR, or other line-of-site dependent laser technology.

An object is targeted as a potential candidate for stitching when it enters a three-dimensional zone configured as a Departure zone, or generally a first location, area or zone. The Departure zone or first zone has attributes to help identify which targets are suitable candidates for stitching, such as direction of travel and time spent in the zone.

Departure zones are linked to one or more three-dimensional Arrival zones, or second zones or areas or locations. Arrival zones have attributes to help identify which targets are suitable candidates for stitching, such as direction of travel and time spent in the zone.

Figure 1:
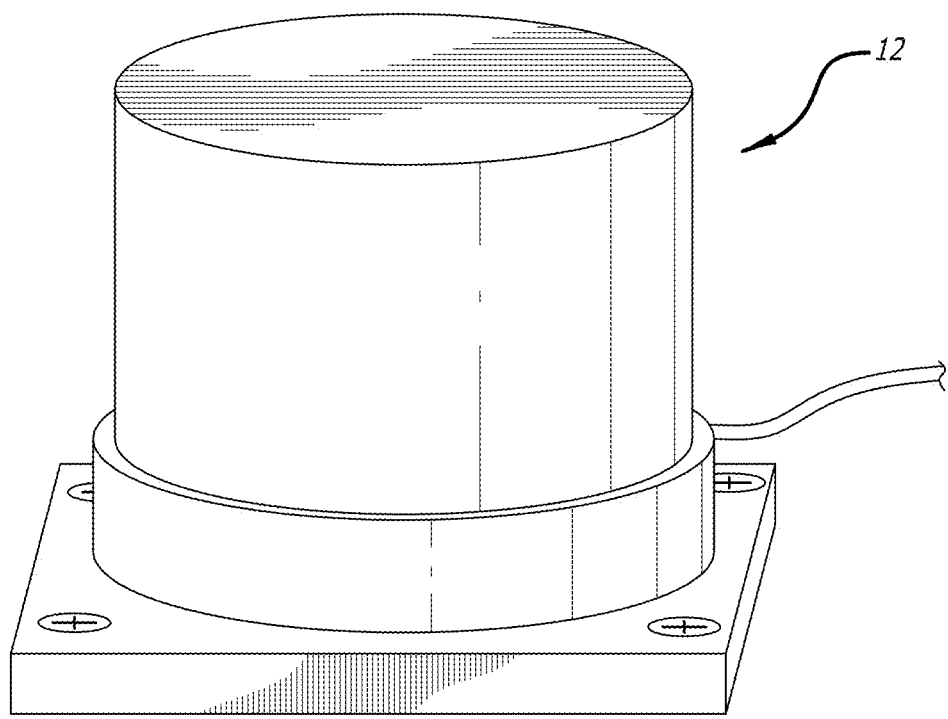
Figure 2A:
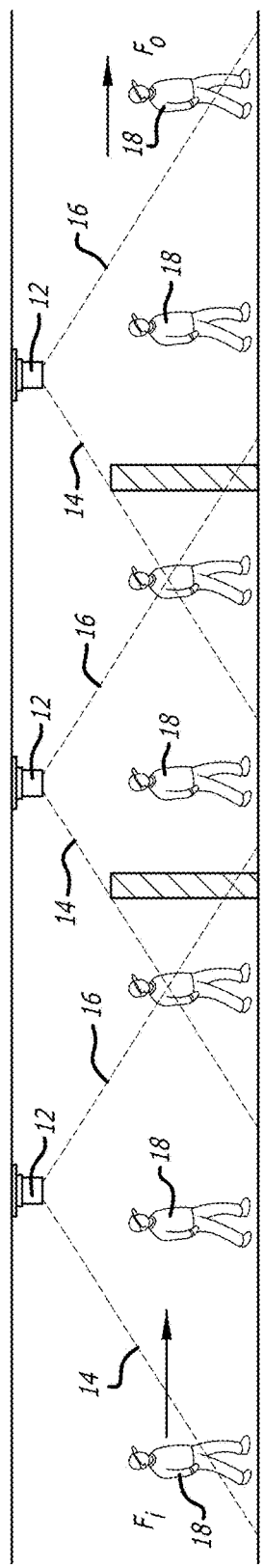
Figure 2B:
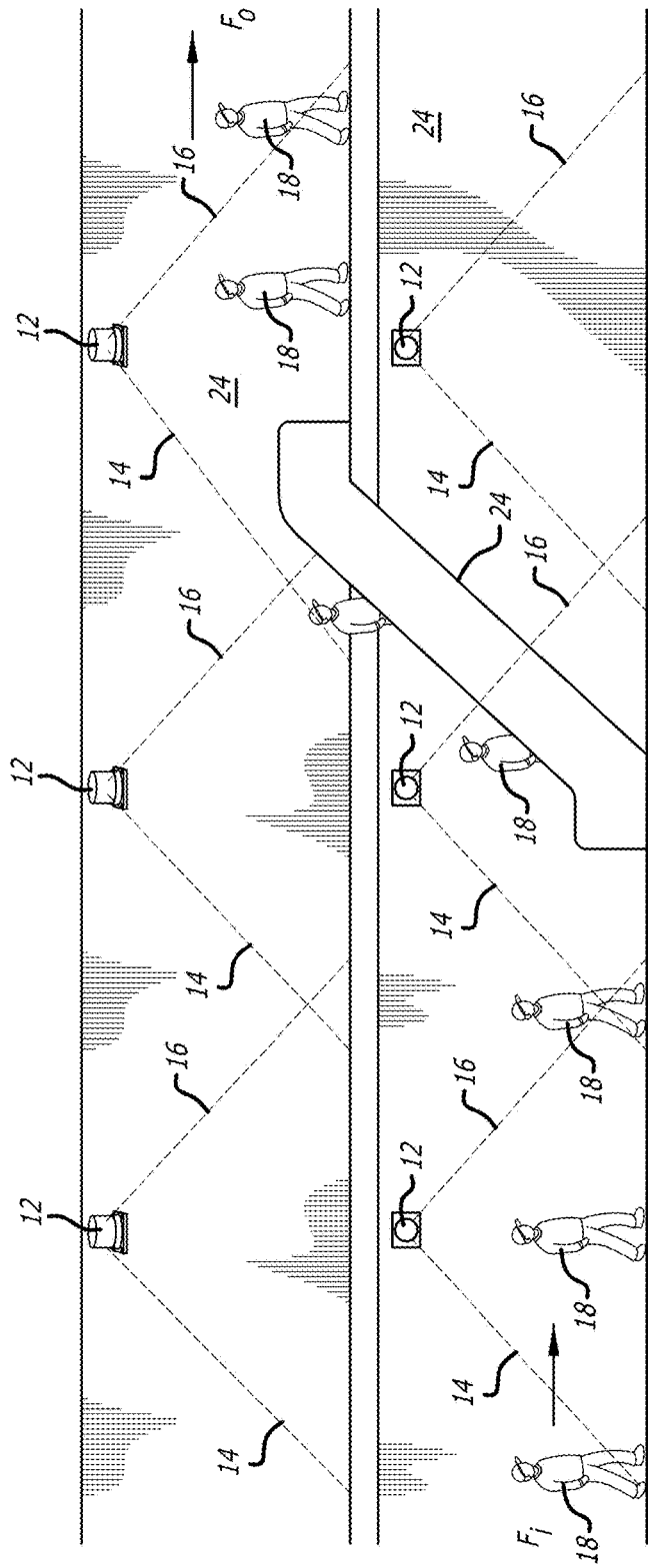

Departure and Arrival zones can be defined anywhere in space, including on top of each other. In FIG. 2B, there is shown a first lower level, for instance an arrival level at a lower level of an airport connected with an escalator 24 to a departure level of an airport. There are thus zones on two different levels. The linking of these zones provides the attributes suggestive of the stitching of targets, such as how long an object must have been lost before the stitching occurs, and the type of stitching algorithm to use, such as a FIFO queue. Depending on the technology in use, physical attributes of the target to be stitched can be factored as well. FIFO is an acronym for first in, first out, a method for organizing and manipulating a data entities, events, where the oldest (first) entry, or 'head' of the queue, is processed first. It is analogous to processing a queue with first-come, where the people leave the queue in the order in which they arrive.

Examples of FIFO and/or stitching algorithms are set out.
Matching a persons' characteristics (height, width, etc.)
Matching a persons' average rate of movement and/or gait
Indifference matching to a specific person as all people have similar wait times before disappearing (i.e. people waiting for a tram or elevator)
Other exemplary algorithms are set out Example #1 algorithm: Overlapping maps. Consider JFK terminal 4. Perhaps it has the capacity to have 300 people, but the simple LiDAR system can only track 200 people consistently. The disclosed system uses and installs two complete LiDAR systems and servers. The first one covers 100% of TSA PRE/PRIORITY and about 33% of General. The second system covers 100% of general and about 33% of TSA PRE/PRIORITY. It's guaranteed that each will lose and regain tracked objects from each one as people are moving around in the middle. However, disclosed system should be able to identify that the person at the end of each detection zone is in fact the same person, because they occupy the same physical space. Instantly disclosed system turns two systems that can only track 200 objects each over a certain area into one system that can track 400 objects.

Example #2 algorithm: Serpentine binding. When a path is known and defined, and has only one entrance and one exit (choke points) it is impossible, within reason, for an object to disappear or appear without that object entering through the entrance and exiting through the exit. This is similar to a FIFO zone. A person must also, under ordinary conditions, stay in line and follow a distinct path. This is similar to GPS snapping. However, while in a serpentine, a person may become obstructed from view of the system by their position or their height. For every object that disappears, it could be assumed that they become assigned to the next appearing object closest to their disappearance point along the serpentine path. This could help overcome blind spots in the object detection stream.

Example #3 algorithm: Representative view of queue movement. When the tracking information is just not reliable from beginning to end, don't show it to the customer in raw form. Instead, count the number of people that enter and exit, generate real time velocity vectors for every part of the path that you can see, detect population density of each area, and make each of your object people follow the path based on all of this input. This would ultimately create a very pretty and realistic view of how the queue is performing without needing to be able to track each person 100% of the time. The output would be a smooth looking line of people, where they are, how fast they're moving, and exactly how many people are in line, even when the LiDAR system output data is incomprehensible.

A flow of an exemplary stitching protocol, procedure, method and process is set out in FIG. 11, and a description of the various steps is as follows:

Object Disappearance
1. LiDAR object tracking in process
2. A tracked object disappears from a LiDAR sensing zone for more than a configured threshold amount of time. The threshold configuration can be site (airport) specific.
3. Mark the tracked object as a candidate for the stationary stitching algorithm.
4. Check if the object disappears in a pre-configured 3-dimensional Departure Zone.
5. The object did not disappear in a Departure Zone, end processing the disappearance event.
6. The object disappeared in a Departure Zone, check if Departure Zone has attributes to validate before considering this object a candidate for the movement stitching algorithm (i.e. minimum dwell in the zone). Skip step 7 if no attributes are defined.
7. Check if the object meets the requirements of the Departure Zone attribute(s), and if not, end processing the disappearance event.
8. Mark the tracked object as a candidate for the movement stitching algorithm.
9. End processing the disappearance event.

Object Appearance
1. LiDAR object tracking in process
2. A new object appears in a LiDAR sensing zone.
3. Check if any candidates exist for the stationary stitching algorithm that are within range of the appeared object.
4. Perform the stitching algorithm on all possible stationary stitching algorithm candidates.
5. Store the candidate(s) successfully stitched with the stationary stitching algorithm for a subsequent final selection.
6. Check if the object appears in a pre-configured 3-dimensional Arrival Zone.
7. Check if any candidates exists for the movement stitching algorithm that disappeared in a Departure Zone linked to the Arrival Zone
8. The object appeared in a linked Arrival Zone, check if Arrival Zone has attributes to validate before considering this object a candidate for the movement stitching algorithm (i.e. minimum dwell in the zone). Skip step 9 if no attributes are defined.

9. Check if the object meets the requirements of the Arrival Zone attribute(s)
10. Perform the stitching algorithm on all possible movement stitching algorithm candidates.
11. Store the candidate(s) successfully stitched with the movement stitching algorithm for a subsequent final selection.
12. Check if we have one or more stitching candidates for final selection.
13. No stitching candidates, end processing the appearance event.
14. Choose the best stitching candidate based on a rules engine configured specifically for the site (airport).
15. Link the disappeared object with the appeared object and continue tracking in the LiDAR sensing zone.
16. End processing the appearance event.

The apparatus, system and method of the disclosure detects, tracks and classify humans, vehicles and other moving objects for security, safety, and business analytics applications. The disclosed solution includes 3D LiDAR sensors, a processing unit, and software. The system can be either deployed in a centralized architecture where several LiDAR sensors are connected to a single processing system or in a distributed architecture where sensors have associated distributed processing systems that can be interconnected which each other to produce the combined output. The disclosed system apparatus and method running on a server consumes the raw point-cloud data from one or more sensors, fuses the data to a combined point cloud and processes the data for publishing an object list that contains information on each object detected and tracked. One or more clients may connect directly to the disclosed server and communicate commands, settings, and server configuration data to the disclosed server.

The apparatus, system and method of the disclosure provides the following benefits to an integrated monitoring system in combination with the LiDAR sensors:

Technology fuses multiple LiDARs for tracking unique objects in complex environments. Fusing data of up to 10 LiDAR sensors to one combine point cloud that is published on local Ethernet.

802.3at (PoE+) will be supported using separate PoE splitter hardware and cabling.

Within line of sight of sensors, ability to continuously track multiple objects simultaneously.

Detection and tracking range up to 150 m

Classification of Shape Data. The sensor produces surveillance data that the host computer collects, records, visualizes, analyzes, classifies, and outputs into an Objects List that serves as the basis for further action, including the notification of external alarm systems via LAN, TCP, and HTTP. Visualizes humans as green shapes and vehicles as magenta shapes.

Moving objects are detected and measured. Objects can be classified in terms of orientation, position, scale, velocity and zone.

Object movement can be tracked in real-time, even in large, crowded environments.

Users can define secure zones. If objects are detected in a zone, the disclosure creates events that can directly control internet alarms and cameras.

Computer systems using local Ethernet can access the object data.

Persistence in Tracking. Commercial-grade, static LiDAR visualization system is able to sense and display the movement of human-sized objects over time, persisting even through blockages and crowd gaps. (This gives users the ability to track and record the historical movements of potential threats.)

The apparatus, system and method of the disclosure ingests that file and aligns the overlapping vision of multiple sensors into an enriched Multi-LiDAR Fusion™ view of the surveilled enhanced area.

Enhances Legacy Systems, and the disclosure reduces or eliminates false positive threats and dramatically boosts the surveillance effectiveness of video monitoring systems (VMS) by measuring and providing exact 3D coordinates of humans.

Log Recording and Playback

Unified Floor and Background detection and filtering

Improved Set-up and Location editor

3D Exclusion Zones

General Perception and classification improvements

In at least one of the sensed areas there is barrier to a first line of sight to at least one LiDAR. As such a human located on a side of the barrier remote from the location of the one LiDAR is not sensed. A second LiDAR is located with a second line of sight relative to the barrier to cover at least part of the blocked first line of sight of the first LiDAR.

In at least one of the sensed areas the barrier to a first line of sight is a security body scanner in an area being an airport terminal. Additionally, or alternatively in at least one of the sensed areas the barrier to a first line of sight is selectively at least one of wall or pillar. This hidden capture could also occur if a human is behind a pillar, in a bathroom, in a retailer, in a tunnel between buildings or a train or bus connecting buildings.

There is a network comprising a single or a plurality of LiDAR lasers, LiDAR laser drivers, LiDAR laser controllers, LiDAR optical amplifiers, LiDAR optical detectors, LiDAR receiver electronics, LiDAR power regulation electronics, LiDAR control electronics, LiDAR data conversion electronics, and LiDAR data processing electronics. Each LiDAR device is in a different geographical area of a building to provide the enhanced area of the building. Each LiDAR device 12 is connected to transmit sensed data to the base 28, whereby the base analyzes the data to obtain tracking information of the movement of human traffic over the enhanced area.

A three-dimensional LiDAR sensing system comprising the time-of-flight LiDAR ranging devices and at least a subset of a set of modules comprising a single or a plurality of global positioning system receiver, global navigation satellite system receiver, visible video camera, infrared video camera, radar, ultrasonic sensor, embedded processor, Ethernet controller, cell modem, Wi-Fi controller, data storage drive, and human machine interface electronics.

There are mountings for each LiDAR device on a ceiling, wall, pillar or pole and the LiDAR device projects downwardly over the respective areas in the building.

Apparatus for providing a tracking service to an operator of a facility comprises at least one and preferably two or more time-of-flight LiDAR ranging devices, each LiDAR device includes an optical transmitter, an optical receiver assembly, power regulation electronics, control electronics, data conversion electronics, and processing electronics.

Each LiDAR device covers a field, zone or area of sensing. Each LiDAR device is mounted within a building on a support structure, and where there are two or more LiDAR devices in spaced relationship from each other the mounting is strategically established and setup so that the sensed coverage is enhanced and the data from each device is contiguous. The fields of sensing from each LiDAR device is at least adjacent the other whereby collectively an enhanced field of sensing of an area in the building is achieved.

Each LiDAR device 12 senses and provides output point cloud data. A base unit and structure 28 is associated with each LiDAR 12 and is tuned to sense human 18 traffic from the point cloud data. The base device 28 for collecting the sensed point cloud data from each LiDAR effects the stitching of the respective point cloud data output and structurally acts to provide the tracking information and movement of human traffic. When two or more LiDAR devices 12 and base units 28 are provided to scan and sense their respective area or zones, a larger area or zone of coverage information over the enhanced area or zone is covered by the two or more LiDAR units 12 and base units 28.

As shown in FIG. 3 there is also shown representatively within block 26 the facility of the base units 28 to receive additional data inputs for instance, from a camera, Bluetooth, wifi node and infrared sensors. A GPS cellular connection can also be provided and there is an image capture interface, structural system for performing analysis for FIFO and providing the overall tracking data in and through base units 28. In other cases, there is no additional data inputs, for instance, from a camera, Bluetooth, wifi node and infrared sensors, or GPS cellular connection, and only the LiDAR device 12 is connected with the base 28.

The devices 12 with base units 28 provide data about the movement of the humans 18 in the facility relative to the location such data including at least one of entry into the location, departure from the location, amount of time spent in the vicinity of the location.

Each base receives the output data from the LiDAR device. Optionally, a central base structure and device 30 is connected with the base device 28 with each LiDAR device 12. A further centralized base station 32 can receive the data from units 30.

The central base can also be structured to receive photograph data to supplement the data from the LiDAR devices. As such this assists in constituting flow control information. There can also be data from a communication device associated with a human. The central base can act as a location server that further receives data associated with the multiple sources of location data received from the zone or area. The server is arranged to compare the received location data and area data defining a plurality of areas and to associate the received location data with one of the plurality of areas; and determining the human's path passing through an area.

The facility can include multiple checking locations wherein humans leaving the facility need to pass through at least one of the checking locations prior to leaving the facility. LiDAR devices are located in a physical location to be related to different respective checking locations of the multiple checking locations. Data from the location LiDAR devices includes at least one of the number of entities passing through different checking locations, the speed with which entities pass through the different checking locations, the number of entities in the vicinity of the different respective checking locations.

The facility includes a sensor for counting humans at or passing through or past selected locations. The facility is an airport terminal and the checking facility is a security checking station, and selectively there are multiple stations.

Apparatus for providing a tracking service to an operator of an airport facility building comprises at least one, or more time-of-flight LiDAR ranging devices, each LiDAR device includes an optical transmitter, an optical receiver assembly, power regulation electronics, control electronics, data conversion electronics, and processing electronics; and each LiDAR covering a field of sensing, the two devices being mounted within a building on a support structure in spaced relationship from each other. The fields of sensing from each LiDAR are at least adjacent the other whereby collectively an enhanced field of sensing of an area in the building is achieved.

Each LiDAR and its base is tuned to sense human traffic. A base or unit collects sensed the output data from each LiDAR device, and as such that tracking information and movement of human traffic. Where there are more than one LiDAR device and base device working together over their respective areas or zones, and in adjacency or contiguity, sensing is collectively achieved over the enhanced area.

The airport facility comprises a door for entry into the facility from an outside position from the facility. There is a first area between the door and a security checking location within the facility. There is a security checking location, and a second area beyond the security checking location. Information is tracked of the movement of humans from the first area through the security checking location and into the second area.

There can be additionally one or more location nodes within the facility, the location nodes including a transceiver of wireless signals, and transmitting the signals received to a base for processing the received signals. The location nodes are located in a specific security checking location within the facility. The nodes are for wireless communicating with movable humans within the facility. This establishes the location and movement of humans within the facility. The humans have wireless communicating units transmitting and receiving signals wirelessly with the node. Each unit is unique for each human and communicating with the node when the human enters at least one area.

The location node includes a detection device. The device includes a radio transmitter/receiver, and the device is capable of detecting the first area entry, dwell and exit events of the human respectively through a communication with the wireless communicating unit of respective human entities. The wireless communicating units are equipped with selectively a Bluetooth and WI-FI radio.

The area of the airport is effectively covered for tracking by using a lesser number of LiDAR devices and a greater number of nodes, the lesser number being by at least a factor of 2 and preferably, a factor of 4.

The location can be a retail store, the store being divided into multi-dimensional areas where the radius and/or shape of each area is configurable. This can be a polygon shape to conform to an area or zone so as effectively required for coverage of the zone or area.

The LiDAR-based apparatus, device, system and method are used for the beamforming and steering of laser beams and the detection of laser beams using photodetectors. Transmitter and receiver electronics, power management electronics, control electronics, data conversion electronics and processing electronics are also included in the system and used in the method.

In a TOF LiDAR application includes an optical transmitter (including laser, laser driver, laser controller, an optical receiver (including photodetector(s), photodetector driver(s), and receiver electronics), and electronics for power regulation, control, data conversion, and processing.

A LiDAR system includes at least one LiDAR, and any subset and any number of the following: Complementary sensors, GPS (Global Positioning System) or GNSS (Global Navigation Satellite System) receiver; IMU (Inertial Measurement Unit); Wheel encoder; Video camera (visible and/ or IR); Radar; Ultrasonic sensor; Data processing/communication/storage modules; Embedded processor; Ethernet controller; Cell modem; Wi-Fi controller; Data storage drive; and HMI (Human Machine Interface) e.g., display, audio, buzzer.

For widening the field of view, a LiDAR system may contain a plurality of LiDAR sensors, a LiDAR sensor may contain a plurality of optical transmitters, The exemplary LiDAR device includes for example the Quanergy™ sensors using Time-of-Flight (TOF) capability to measure the distance and reflectivity of objects and record the data as a reproducible three-dimensional point cloud with intensity information. Operating at the 905 nm wavelength, sensitive detectors calculate the light's bounceback Time-of-Flight (TOF) to measure the object's distance and record the collected data as a reproducible three-dimensional point cloud. The sensor's ability to detect objects that vary in size, shape, and reflectivity is largely unaffected by ambient light/dark, infrared signature, and atmospheric conditions.

The disclosed system, apparatus and method are different to the exemplary Quanergy device and system.

If an object is obscured using a simple Quanergy device, the Quanergy device takes the direction and velocity vectors and continue the track on a newly appeared object in the range of movement in that vector within a certain amount of time. In the disclosed system, apparatus and method, for example, two distinct objects produced by a Quanergy system are joined together based on knowledge of the environment and facility to effect effective tracking.

Other exemplary devices could be a Velodyne™ LiDAR.

The LiDAR sensing technology can be solid state implementations, which contain no moving or vibrating parts on either macro or micro scales. Through the interaction of three main components—emitter, receiver and signal processor—the laser creates a real-time, long-range 3D view of the environment and provides the ability to recognize and classify objects. Artificial-intelligence software enables the perception of objects based on data collected by one or more LiDAR sensors. The software can be applied to enable rapid 3D detection, measurement, tracking, identification and classification of objects, as well as triggering actions based on real-time scenario analysis. The perception software can run on top of visualizers such as RViz or PCL CloudViewer to display the data points and moving objects as a point cloud 3D map.

Multiple laser beams and Time-of-Flight (TOF) depth perception result in 3D point clouds for spatial sensing. With a 360° field of view, 420,000 points per second, long measurement range, high accuracy, and fine resolution, technology that combines multiple LiDARs into a single unified point cloud, for tracking unique objects in complex environments.

The 360° 3D Time-of-Flight (TOF) LiDAR M8-1™ sensors enable rapid 3D detection, measurement, tracking, identification and classification of items, as well as triggering actions based on real-time scenario analysis supported by advanced perception software. True 3D mapping on a global scale is possible with broad deployment. High-definition TOF LiDAR sensor enables use of sensing in dynamic environments. Multiple laser beams and TOF depth perception result in 3D point clouds for 3D sensing.

There are 8 sensing layers, a wide Field of View (FOV), long measurement range, fine horizontal resolution, a Laser Class IEC 60825-1:2007—Class 1 Laser Product (eye safe) unit with a wavelength of 905 nm. A measurement technique for Time of Flight (TOF), a measurement range of 150 m (80% reflectivity), a range accuracy at 50 m of <5 cm.; a frame rate (Update Frequency) of 5-30 Hz; an angular resolution of 0.03-0.2° and the sensors include 8 laser/detector pairs. The Field of View (FOV) is Horizontal: 360°, Vertical: 20° (+3°/−17°). The Output Rate is >400,000 points per second.

Software tools and solutions are based on 86-64 architecture on the host computer to enable all or some of the following functionality: discovery and management of the sensor; collection, recording, playback, and visualization of the sensor's data, and calibration of multiple sensors mapping the same scene.

The sensor works with several computing environments, software-based sensor discovery and management toolkit that enables users to visualize a point cloud and calibrate pairs of sensors. The operating system can be the open source Ubuntu 14.04 LTS operating system running either natively or virtually via VMware or Oracle VM VirtualBox or other operating system that is capable of initiating a TCP connection with the sensor. In the Windows environment, users visualize a basic point cloud.

The LiDAR devices provide a 360° field of view, long measurement range, accuracy, and fine resolution. An enriched point cloud for 3D mapping is obtained as each emitted laser pulse reflects off multiple objects and return to the LiDAR sensor as one or more return pulses. The sensor measures and evaluates the distances and intensities of as many return pulses as there are, follows rules for which particular return values to report, then reports the distances and intensities of up to three of those return values.

The distance and intensity of each return pulse is evaluated to determine which is:

Maximum—has the highest intensity/amplitude.
Second Strongest—has the second highest intensity/amplitude.
Last—has the highest range, that is, is the longest time-of-flight from the sensor. The evaluation rules for assigning these labels are as follows:
If no return pulses are detected, each of the three return values is 0.
If one or more return pulses are detected:
The first return value (Return 0) equals Maximum.
The second return value (Return 1) equals Second Strongest. (But if there was only one return pulse, the return value equals Maximum.)
The third return value (Return 2) equals Last, which may be equal to Second Strongest or Maximum.

This permits rapid 3D detection, measurement, identification, tracking, and classification of items, as well as triggering actions based on real-time scenario analysis supported by advanced perception software. The sensor is mounted upside-down from a fixture on the ceiling, and connected directly to the host computer's network port. The sensor is compatible with any operating system that is capable of initiating a TCP connection with the sensor.

The laser firing spins at 10 Hz. The lasers fire at a constant rate of 53,828 Hz. The lasers do not fire simultaneously, but in a sequence to avoid interference. The firing sequence is 0, 4, 2, 6, 1, 5, 3, 7, where 0 is the lowest downward-looking beam, and 7 is the highest upward-looking beam. There is no horizontal or vertical angle offset.

Beam Angles of the pointcloud generator_source code specifies beam separation angles, from bottom angle to top, in radians. The values in the code are designed for working with optics. In round numbers, the vertical field of view is 20 degrees, the theoretical value for beam spacing is 3 degrees, and the top beam is about +3 degrees.

The PPS signal (nanosecond counter) provided by a GPS receiver makes a NMEA timestamp accurate. The GPS unit's PPS signal frequently corrects local PPS from drifting to provide an accurate clock. Data Communication uses the NMEA 0183 standard and ASCII (text) serial communications protocol to encode its data, the data is readable when it is opened in a text editor. Different types of NMEA messages are sent from a talker such as a GPS receiver to one or more listeners, including M8 sensors. The sensor accepts the GPS unit's NMEA sentence in the $GPRMC and $GPZDA forms. If the GPS sends both messages, the sensor uses whichever it receives first.

Although the exemplary Quanergy LiDAR has been described, other LiDAR devices are suitable, including those which are totally solid state devices.

The present disclosure provides a system and method that provides a location-based service to an operator of a facility. In one form, the facility is a physically defined structure formed by physical walls.

The facility can include a series of location nodes, the location nodes including transceivers of wireless signals, and being for transmitting the signals received to a central hub for processing the received signals. The nodes are located in spaced apart positions in the facility. The nodes are for wireless communication with movable entities in the facility thereby to establish the location and movement of entities in the facility, the entities having wireless communicating units for transmitting signals wirelessly to the nodes.

The nodes provide data about the movement of the entities in the facility, and such data includes at least one of entry into the facility, departure from the facility, amount of time spent in the vicinity of nodes located in the spaced apart positions; the travel path of the entities in the facility.

There are multiple single shot and/or video cameras for periodically photographing the facility, the cameras being distributed about the facility. The photographs are transmitted from the multiple cameras to a control station. The control station receives the data from the location nodes and the photographs to constitute line flow control information.

The disclosure also includes people counters. These are infrared sensors placed above doors, chokepoints and walkways and/or in or out of designated areas. They are designed to count how many people cross a threshold with a high degree of accuracy. Other forms of people counters include break beam lasers and pressure-sensitive flooring/floor mats.

The information from the nodes, camera and sensors are aggregated and analyzed and constitute a tool to plan operations in the facility and personnel assignment in the facility.

Users of the system, for instance store or airport operators as well as public shoppers or travelers can sign in via an app or computer program remotely to determine line conditions, in a simple manner similar to which map data is made available by navigation apps. and programs to facilitate travelling conditions on roads.

The data is for transmittal to the operator of a facility in at least one of real time or for storage and analysis at a later time for use by the operator.

In one form, the facility includes multiple checking locations. A checking location can for instance be a check out at supermarket or store or mall, a series of stores, a security scanning checking place at an airport facility, a ticket counter, or a baggage claim area at an airport.

Persons leaving the facility need to pass through at least one of the checking locations prior to leaving the facility. The nodes are located in a physical location to be related to different respective checking locations of the multiple checking locations. Data from the location nodes includes at least one of the number of entities passing through different checking locations, the speed with which entities pass through the different checking locations, the number of entities in the vicinity of the different respective checking locations.

The facility can be a shopping business. The check-out locations include registers for receiving payment for items purchased in the shopping business. The data includes at least one of the entity check-out rate from the facility; the entity entry volume to the facility, the entity entry volume relative to different time periods; the rate of entity entry to the facility, the rate at which entities enter and leave the facility; the amount of time spent by different entities in the facility.

The data also relates to distinguish the number of entities spending different amounts of time in the facility. The different check-out facilities are designated for have the low volume shoppers in dedicated checking facilities and the data includes information about the numbers of low volume shoppers, high volume shoppers and the rate of time shoppers spend in the facility and at the checking locations.

The system can include two, multidimensional such as three dimensional, geographical areas for characterizing the movement and behavior patterns of a mobile user moving through an array of the geographical areas.

Where the location is a retail store, the store is divided into multi-dimensional areas where the radius of each area is configurable, selectively from about three to about thirty feet or more.

The nodes are detection devices that are radio transmitter/receivers, placed at the center of each area. The devices are capable of detecting the area entry and exit events of mobile personal devices equipped with selectively a Bluetooth, WI-FI and other short range radio technologies or NFC systems. Each device is an element or node of a network connected to the Internet through a Wi-Fi bridge or base station, and selectively there are several separate networks formed by the nodes.

As a mobile user moves through the store, area entry and exit events are collected, time stamped, and passed along the networks to the Internet. The event trail is routed to a remote server and placed in a database for analysis where behavior details are extracted from the entry/exit data.

The node is located in a specific location in the facility, and the node is for wireless communication with movable entities in the facility thereby to establish the location and movement of entities in the facility. The entities have wireless communicating units for transmitting signals wirelessly to the node. The node provides data about the movement of the entities in the facility relative to the location such data including at least one of entry into the location, departure from the location, amount of time spent in the vicinity of the location. The data is transmitted to the operator in at least one of real time or being for storage and analysis at a later time for use by the operator.

The facility includes at least one checking location, and persons passing through the facility should pass through that at least one of the checking locations. Upon exit, should an entity not pass through a checking location, the system determines that someone visited but did not necessarily buy, or the visit was not converted to a sale. Thus, the nodes can be strategically placed in the facility to permit the mining of the needed data. A node is located in a physical location to be related to the at least one checking location and wherein data from the location nodes includes at least one of the number of entities passing through the checking location, the speed with which entities pass through the checking location, the number of entities in the vicinity of the checking location.

The facility can be an airport terminal and the checking facility is a security checking station. Selectively there are multiple stations.

A retail store can be divided into two or three-dimensional areas where the radius or polygon of each area is configurable, from three to thirty feet or more. The detection devices, small radio transmitter/receivers, placed at the center of each area, and are capable of detecting the area entry and exit events of mobile personal devices equipped with either a Bluetooth or WI-FI radio or NFC system. Each device is an element or node of a network connected to the Internet through a Wi-Fi bridge or base station. Typically, several separate networks are formed by the nodes.

As a mobile user moves through the store, area entry and exit events are collected, time stamped, and passed along the networks to the Internet. Ultimately, the event trail is routed to remote servers and placed in a database for analysis where behavior details are extracted from the entry/exit data.

The tracking monitor system includes multiple LiDAR devices located on a wall pillar or the ceiling or generally above the floor and located in a distribution over a geographical area of a building. In addition to LiDAR devices there can be one or more nodes, one or more base stations, and a remote system server.

The node can be a small radio frequency (RF) receiver and transmitter (transceiver). It can be either a Bluetooth device or a Wi-Fi device or NFC system. Software in the System Server contains its ID and the exact geographical location of its position in the area layout as well as the diameter of its assigned virtual area.

The Bluetooth node continuously transmits a general inquiry message (3200 times per second) and listens for a mobile device response. Mobile devices continuously listen for inquiries, and after receiving one, respond with a message containing its unique Bluetooth MAC address and its device type.

Firmware in the node collects the MAC address, type, and the node received signal strength (RSS), and returns these information items, via the Internet, to the Scan Service software resident in the Managed System Server.

After the initial reception from a mobile device, its unique Bluetooth MAC address is registered and time stamped. Subsequent messages are sampled at intervals of one to thirty seconds, and an event trail time history is developed as the mobile device moves through the array of areas, entering, dwelling in, and exiting from one area to another. Mobile device positions relative to the node position are determined from the RSS data.

Area proximity results are most effective when the nodes are configured to transmit at very low outputs, say around one-millionth of a watt.

Wi-Fi and Bluetooth LE nodes operate in a completely passive mode. No transmissions are involved. In all other respects, they are identical to the Bluetooth nodes, Wi-Fi and Bluetooth LE nodes listen to mobile device wireless transmissions and collect the same data items, i.e., MAC address, device type and RSS, and return them to the Managed System Server via the Internet.

Bluetooth nodes in the system are capable of maintaining seven simultaneous communications links with other Bluetooth devices. Two of those links are used to form a network or chain with two other nearby nodes. Data acquired by each node is passed along the chain from one to another and finally through the base station bridge to the Internet.

A base station consists of multiple transceivers, for instance one for LiDAR sensing data, one for a Bluetooth device, and another for Wi-Fi. The Bluetooth device acts as a node connecting to one or more chains, and passing data from the other nodes on the chain to the Wi-Fi device, which then passes the data to the Internet. A wired base station needs only a single radio.

The system is applicable to mass transit locations. These can be provided with the LiDAR devices. There are also existent Wi-Fi providers, for instance at airports. The Bluetooth technology provides a precise and secure passive analytics on the market. As cell phones such as smartphones and wearables use Bluetooth, the system operates broadly, and no or minimal application or consumer forced interaction is required.

The multi-dimensional sense can be a three-dimensional sense in the x, y and z axes or coordinates. The system allows for three-dimensional tracking according to the placement of the LiDAR devices and nodes in a three-dimensional sense.

The data transmission to the operator is in at least one of real time or being for storage and analysis at a later time for use by the operator. There is an algorithm, executable by a computer processor, for processing the data. The data includes entry into the location and departure from the location; and the data including information of the number of entities in the vicinity of the security checking location within the facility area.

There can additionally be one camera or multiple cameras for periodically photographing the facility, the cameras being distributed about the facility. Photographs are transmitted from the multiple cameras to a control station. The control station receives the data from the location nodes and the photographs to constitute line flow control information. Selectively the facility can include a sensor for counting entities at or passing through or past selected locations.

The information is a tool to monitor and/or plan operations in the facility and personnel and employee assignment such as check in personnel, check out personnel, security checking personnel in the facility. Personnel employed in a facility may have tags or badges with a transponder for communication with the nodes.

The airport facility includes a series of LiDAR devices and other location nodes in the facility. The location nodes include transceivers of wireless signals, and transmit the signals received to a central hub for processing the received signals. The nodes are located in spaced apart positions in the facility.

The airport facility includes at least one checking location. Persons passing through the facility need to pass through at least one of the checking location, and wherein a node is located in a physical location to be related to the at least one checking location. The algorithm relates the data, and the data from the location nodes includes at least one of the number of entities passing through the checking location, the speed with which entities pass through the checking location, and the number of entities in the vicinity of the checking location.

The disclosure includes a passive indoor flow and/or line management and/or shopper analytics system, apparatus and method for line management in shopping environments, airports, passenger terminals of different kinds, sports stadiums, theatres, shopping malls, entertainment areas and venues where lines of people accumulate. There is an accuracy within a few centimeters.

In some cases, there can be monitoring of and/or within parking structures and approaches to parking structures and airport or terminal facilities. In these cases, the monitoring is of smart communication devices which maybe in automobiles or with persons in automobiles.

This advanced method of measuring indoor customer location, and also persons standing in a line puts actionable data and insights at a user's control. Data is presented in graphical dashboards that include behavioral snapshots, gauges, graphs, heat maps and trending data. Reports include individuals such as traveler's, passenger's, shopper's path, dwell time, traffic density and other metrics delivered by display, department, location, region, and national views.

The disclosure includes a system and method for determining a user's path. There is a server arranged to receive location data of a communication device associated with the user, the location data defining the detected position of the communication device at a number of different points in time. The location server is further arranged to receive data associated with the location data indicative of the order in which the location data was determined. The server is further arranged to compare the received location data and area data defining a plurality of areas and to associate the received location data with one of the plurality of areas.

The user's path passing through an area defined by the associated location data and the associated data is determined. Also, there is the storage for a plurality of user profiles wherein each user profile is defined by area data defining an order in which a given type of user passes through the plurality of areas. The determined path of the user passing through the of areas with the user profiles is compared, and the server is further arranged to associate the user with a given user profile and to process and the path of the user.

The server is further arranged to track the location of user at a point in time on the path based on real time or cached location data. The server is configured to receive location data comprising timestamp data indicative of when the location of the device was determined. The server is further configured to determine the user's dwell time at a particular location or within an area based on the processed associated location data. The server is further configured to determine the number of points on the determined user path, and preferably to compare the determined number of points with a predetermined threshold stored in a storage means. The server is further configured to determine the user dwell time only if the number points on the determined user path is greater than the predetermined threshold.

Chaining:

Although each node and Base Station requires power, they communicate with each other wirelessly via Bluetooth Scatternets. Serial chains are formed, node to node, ultimately terminating at a single Base Station. Chains enable two-way communications with a central control center infrastructure. Messages initiated by the Managed Network (Commands) are passed downstream to the Base Station and/or one or more nodes. Nodes and Base Stations generate device detections and responses to commands, which are passed upstream to the Base Station, who forwards it on to the Managed Network via an encrypted Internet connection.

Although the disclosure relates and discloses in detail LiDAR devices. Other laser devices could be effective in the disclosed system. While the above description contains many, these should not be considered limitations on the scope of the disclosure, but rather a demonstration of embodiments thereof. The system and methods disclosed herein include any combination of the different species or embodiments disclosed. Accordingly, it is not intended that the scope of the disclosure in any way be limited by the above description. The various elements of the claims and claims themselves may be combined in any combination, in accordance with the teachings of the present disclosure, which includes the claims.

We claim:

1. A three-dimensional LiDAR device sensing system comprising at least two time-of-flight LiDAR ranging devices, each LiDAR device includes an optical transmitter, an optical receiver assembly, power regulation electronics, control electronics, data conversion electronics, and processing electronics; and each LiDAR device covering a field or area of sensing of human traffic subjects, the two devices being mounted within a building on a support structure in spaced relationship from each other, the fields of sensing from each LiDAR device being at least adjacent the other whereby collectively an enhanced field or area of sensing of an area in the building is achieved, each LiDAR device being tuned to sense human traffic, a unit for collecting sensed data from each LiDAR device such that tracking information and movement of human traffic over the enhanced area is received by the unit, the sensing data of each LiDAR device being stitched by a stitching analytical process with data from the other data from the associated LiDAR device to provide an enlarged sensing profile, and wherein the stitching analytic process is effected on a principal of providing a predicted movement of sensing of the human traffic subjects being sensed in a queue, such that when movement of separate sensing of movement of the human traffic subjects does not occur within a predetermined time, the stitching analytic process projects representative movement of the subjects in the queue including inputs of tracking information being (i) counts the number of subjects that enter and exit a queue, (ii) generating real time velocity vectors for selected parts of the queue, (iii) detecting subject population density of the selected parts of the queue, and (iv) rendering sensed subjects to follow a path based on this processed analysis of the inputs (i); (ii) and (iii), thereby to obtain data on queue performance without the need to track each subject all of the time.

2. The apparatus as claimed in claim 1 wherein such analytic process includes a first in/first out (FIFO) analysis.

3. The apparatus as claimed in claim 1 wherein the fields of sensing of each LiDAR device overlap each other, and an analytic program for stitching the sensed data from each LiDAR device to obtain a stitched map of sensed data over the enhanced area.

4. The apparatus as claimed in claim 1 wherein in at least one of the sensed areas there is barrier to a first line of sight to at least one LiDAR device, such that a human located on a side of the barrier remote from the location of the one LiDAR device is not sensed, and wherein the second LiDAR device is located with a second line of sight relative to the barrier to cover at least part of the blocked first line of sight of the first LiDAR device.

5. The apparatus as claimed in claim 4 wherein in at least one of the sensed areas the barrier to a first line of sight is a security body scanner in an area being an airport terminal.

6. The apparatus as claimed in claim 4 wherein in at least one of the sensed areas the barrier to a first line of sight is selectively at least one of wall or pillar.

7. The apparatus of claim 1 including a network comprising a single or a plurality of LiDAR device lasers, LiDAR laser drivers, LiDAR laser controllers, LiDAR optical amplifiers, LiDAR optical detectors, LiDAR receiver electronics, LiDAR power regulation electronics, LiDAR control electronics, LiDAR data conversion electronics, and LiDAR data processing electronics, each LiDAR device is located in a different geographical area of a building to provide the enhanced area of the building, and each LiDAR device is connected to transmit sensed data to the unit, whereby the unit analyzes the data to obtain tracking information of the movement of human traffic over the enhanced area.

8. The apparatus of claim 1 including separately from the LiDAR and for separate sensing of movement of the human traffic subjects at least a plurality of a visible video camera, an infrared video camera, an ultrasonic sensor, a cell modem and a Wi-Fi node.

9. The apparatus of claim 8 wherein the output is a relatively smooth queue line data of human traffic subjects including at least one of where they are in the queue, how fast they are moving in the queue, and how many subjects are in the queue relative to unprocessed unstitched input data of the subjects to the LiDAR system.

10. The apparatus of claim 1 wherein the output is a relatively smooth queue line data of human traffic subjects including at least one of where they are in the queue, how fast they are moving in the queue, and how many subjects are in the queue relative to unprocessed unstitched input data of the subjects to the LiDAR system.

11. A three-dimensional LiDAR device sensing system comprising at least two time-of-flight LiDAR ranging devices, each LiDAR device includes an optical transmitter, an optical receiver assembly, power regulation electronics, control electronics, data conversion electronics, and processing electronics; and each LiDAR device covering a field or area of sensing, the two devices being mounted within a building on a support structure in spaced relationship from each other, the fields of sensing from each LiDAR device being at least adjacent the other whereby collectively an enhanced field or area of sensing of an area in the building is achieved, each LiDAR device being tuned to sense human traffic, a unit for collecting sensed data from each LiDAR device such that tracking information and movement of human traffic over the enhanced area is received by the unit, the sensing data of each LiDAR device being stitched by an analytical process with data from the other data from the associated LiDAR device to provide an enlarged sensing profile, for providing a tracking service to an operator of a facility;
  the devices providing data about the movement of the humans in the facility relative to the location such data including at least one of entry into the location, departure from the location, amount of time spent in the vicinity of the location;
  the unit receiving the data from the devices and photographs from a camera to constitute flow control information;
  a location server for receiving location data of a communication device associated with a human, the location data defining the detected position of the communication device at a number of different points in time, the location server further being arranged to receive data associated with the location data indicative of the order in which the location data was determined; wherein the server is further arranged to compare the received location data and area data defining a plurality of areas and to associate the received location data with one of the plurality of areas; and determining the human's path passing through an area; and
  the tracking service receiving data from the unit, the flow control information of the photographs and the location data from the location server.

12. The apparatus of claim 11 wherein the facility includes multiple checking locations wherein humans leaving the facility need to pass through at least one of the checking locations prior to leaving the facility, and including locating the LiDAR devices in a physical location to be related to different respective checking locations of the multiple checking locations and wherein data from the location LiDAR devices includes at least one of the number of entities passing through different checking locations, the speed with which entities pass through the different checking locations, the number of entities in the vicinity of the different respective checking locations.

13. The apparatus of claim 12 wherein the facility includes a sensor for counting humans at or passing through or past selected locations.

14. The apparatus of claim 12 wherein the facility is an airport terminal and the checking facility is a security checking station, and selectively there are multiple stations.

15. A three-dimensional LiDAR device sensing system comprising at least two time-of-flight LiDAR ranging devices, each LiDAR device includes an optical transmitter, an optical receiver assembly, power regulation electronics, control electronics, data conversion electronics, and processing electronics; and each LiDAR device covering a field or area of sensing, the two devices being mounted within a building on a support structure in spaced relationship from each other, the fields of sensing from each LiDAR device being at least adjacent the other whereby collectively an enhanced field or area of sensing of an area in the building is achieved, each LiDAR device being tuned to sense human traffic, a unit for collecting sensed data from each LiDAR device such that tracking information and movement of human traffic over the enhanced area is received by the unit, the sensing data of each LiDAR device being stitched by an analytical process with data from the other data from the associated LiDAR device to provide an enlarged sensing profile, wherein the plurality of areas having LiDAR device search areas are located on different floors of a building, the floors being in different vertically disposed relationship to each other, and wherein the analytic process effects stitching of data from the different floors, thereby to track humans moving between the different floors.

16. The apparatus of claim 15 and in addition to the analytical process effecting stitching of the data from the different floor levels, the analytic process effects stitching of data on each of respective multiple floor levels thereby to track humans moving between the different floors and on each floor.

17. A three-dimensional LiDAR device sensing system for providing a tracking service to an operator of an airport facility-building, the airport facility comprising a door for entry into the facility from an outside position from the facility, a first area between the door and a security checking location within the facility, the security checking location, and a second area beyond the security checking location and providing information of movement of humans from the first area through the security checking location and into the second area, including applying data from: at least one time-of-flight light detection and ranging sensor ('LiDAR") ranging device, the LiDAR device includes an optical transmitter, an optical receiver assembly, power regulation electronics, control electronics, data conversion electronics, and processing electronics; and the LiDAR device covering a field or area of sensing of a zone, the device being mounted within a building on a support structure, the LiDAR device providing data from the field or area of sensing of the zone, such data including from the LiDAR device being for sensing human traffic from the sensed data, and providing a sensing profile of tracking information and movement of human traffic over the field or area, the sensing data of the LiDAR device being in an analytical process to provide a sensing profile, the profile additionally including data relating to characteristics of the field or area of sensing in the building, and wherein the profile additionally includes data relating to characteristics of a normal regular expected pattern or sequence of activity in the building, applying artificial intelligence software to enable a perception of objects based on data collected by one or more LiDAR sensors, and software for enabling detection, measurement, tracking, identification and classification of objects, and further selectively triggering actions based on real-time scenario analysis in 3D.

18. The three-dimensional LiDAR device sensing system as claimed in claim 17 comprising at least two time-of-flight LiDAR ranging devices, and each LiDAR device covering a field or area of sensing, the two devices being mounted within a building on a support structure in spaced relationship from each other, the fields of sensing from each LiDAR device being at least adjacent the other whereby collectively an enhanced field or area of sensing of an area in the building is achieved, the sensing data of each LiDAR device being stitched by an analytical process with data from the other data from the associated LiDAR device to provide an enlarged sensing profile,
- a location node within the facility, the location node including a transceiver of wireless signals, and transmitting the signals received to a base for processing the received signals;
- the location node being located in a specific security checking location within the facility, the node wireless communicating with movable humans within the facility thereby to establish the location and movement of humans within the facility, the humans having wireless communicating units transmitting and receiving signals wirelessly with the node, each unit being unique for each human and communicating with the node when the human enters at least one area;
- the location node including a detection device, the device including a radio transmitter/receiver, the device being capable of detecting the first area entry, dwell and exit events of the human respectively through a communication with the wireless communicating unit of respective human entities, the wireless communicating units equipped with selectively a Bluetooth and WI-FI radio; and
- the tracking service receiving data from the unit, and the location data from the location node.

19. The apparatus of claim 18 wherein the enhanced area of the airport is a defined area effectively covered for tracking collectively by using a lesser number of LiDAR devices and a greater number of nodes over the defined area, the lesser number being by at least a factor of 2 and preferably, a factor of 4.

20. The apparatus of claim 18 wherein the node is for receiving location data of a communication device associated with a human, the location data defining the detected position of the communication device at a number of different points in time, the location server further being arranged to receive data associated with the location data indicative of the order in which the location data was determined; and a server connected with t the node and arranged to compare the received location data and area data defining a plurality of areas and to associate the received location data with one of the plurality of areas; and determining the human's path passing through an area.

21. The system of claim 17 wherein the LiDAR device is tuned to sense human traffic, a unit for collecting sensed data from the LiDAR device such that tracking information and movement of human traffic over the enhanced area is received by the unit, the stitching analytic process being effected on a principal of providing a predicted movement of sensing of the human traffic subjects being sensed in a queue, such that when movement of separate sensing of movement of the human traffic subjects does not occur within a predetermined time, the stitching analytic process projects representative movement of the subjects in the queue including inputs of tracking information being (i) counts the number of subjects that enter and exit a queue, (ii) generating real time velocity vectors for selected parts of the queue, (iii) detecting subject population density of the selected parts of the queue, and (iv) rendering sensed subjects to follow a path based on this processed analysis of the inputs (i); (ii) and (iii), thereby to obtain data on queue performance without the need to track each subject all of the time.

* * * * *